US008073251B2

(12) United States Patent
Matsuoka et al.

(10) Patent No.: US 8,073,251 B2
(45) Date of Patent: Dec. 6, 2011

(54) IMAGE PROCESSING APPARATUS AND METHOD INCLUDING PAGE-BACKGROUND PROCESS CAPABILITY, AND NON-TRANSITORY COMPUTER READABLE STORAGE MEDIUM FOR CAUSING COMPUTER TO FUNCTION AS THE SAME

(75) Inventors: Tomoe Matsuoka, Nishinomiya (JP); Michiko Fujiwara, Yamatokoriyama (JP); Tatsuya Tanaka, Yamatokoriyama (JP); Norihide Yasuoka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 967 days.

(21) Appl. No.: 12/069,771

(22) Filed: Feb. 13, 2008

(65) Prior Publication Data

US 2008/0199076 A1  Aug. 21, 2008

(30) Foreign Application Priority Data

Feb. 16, 2007 (JP) ................. 2007-037170

(51) Int. Cl.
G06K 9/00 (2006.01)
G06K 1/00 (2006.01)
G06F 15/00 (2006.01)
H04N 1/60 (2006.01)
G03F 3/08 (2006.01)
(52) U.S. Cl. .......... 382/167; 382/162; 358/1.9; 358/518
(58) Field of Classification Search .......... None
See application file for complete search history.

(56) References Cited

U.S. PATENT DOCUMENTS

| 5,245,417 | A | * | 9/1993 | Hibi et al. ............... 358/515 |
| 5,850,298 | A | * | 12/1998 | Narahara et al. ........... 358/518 |
| 6,628,833 | B1 | * | 9/2003 | Horie ..................... 382/173 |
| 2003/0133607 | A1 | * | 7/2003 | Goto et al. ............... 382/162 |
| 2005/0068592 | A1 | * | 3/2005 | Kim et al. ............... 358/498 |

(Continued)

FOREIGN PATENT DOCUMENTS

| CN | 1809117 A | 7/2006 |
| JP | 2001-285635 A | 10/2001 |
| JP | 2004-193674 A | 7/2004 |
| JP | 2004-272557 A | 9/2004 |
| JP | 2005-012668 A | 1/2005 |

(Continued)

*Primary Examiner* — Samir Ahmed
*Assistant Examiner* — Li Liu
(74) *Attorney, Agent, or Firm* — Edwards Wildman Palmer LLP; David G. Conlin; David A. Tucker

(57) ABSTRACT

An image processing apparatus includes: a document type automatic classification section which determines whether input image data is image data for a text document or not; a newspaper document classification section which determines whether the input image data is image data for a newspaper document or not; a segmentation process section which identifies a page-background region in the input image data; and a color correction section for, if the input image data is classified as the text document and but not the newspaper document and if a page-background removal process is to be performed to the input image data, performing a first page-background removal process to the image data, but if the input image data is classified as the text document and the newspaper document, not performing the first page-background removal process to the image data. This makes it possible to prevent deterioration of visual sharpness of the text in the document image printed on the newspaper.

9 Claims, 12 Drawing Sheets

U.S. PATENT DOCUMENTS

| | | | |
|---|---|---|---|
| 2005/0219576 A1* | 10/2005 | Eun | 358/1.9 |
| 2006/0164691 A1 | 7/2006 | Adachi | |
| 2006/0215194 A1 | 9/2006 | Gotoh et al. | |
| 2006/0274376 A1* | 12/2006 | Bailey et al. | 358/3.26 |
| 2007/0071334 A1* | 3/2007 | Sakaue | 382/239 |
| 2007/0091341 A1* | 4/2007 | Yamada | 358/1.12 |

FOREIGN PATENT DOCUMENTS

| | | |
|---|---|---|
| JP | 2005-045466 A | 2/2005 |
| JP | 2005-101765 A | 4/2005 |
| JP | 2005-174170 A | 6/2005 |
| JP | 2006-279329 A | 10/2006 |

* cited by examiner

FIG. 7

| SEGMENTATION RESULT | PAGE-BACKGROUND REMOVAL (Need or not) (WITH PAGE-BACKGROUND) |
|---|---|
| TEXT | YES |
| TEXT + HALFTONE, PHOTOGRAPH, OR THE LIKE. | NO |
| HALFTONE | NO |
| PHOTOGRAPH | NO |
| NEWSPAPER (TEXT) | YES |
| NEWSPAPER (TEXT + HALFTONE, PHOTOGRAPH, OR THE LIKE) | NO |
| NEWSPAPER (PHOTOGRAPH) | NO |

FIG. 8

| DOCUMENT TYPE | AUTOMATIC EXPOSURE | | COLOR CORRECTION | FILTER |
|---|---|---|---|---|
| | WITHOUT PAGE-BACKGROUND | WITH PAGE-BACKGROUND | | |
| NEWSPAPER (TEXT) | | OFF | NEWSPAPER TEXT COLOR CORRECTION TABLE (TEXT MODE 2) | NEWSPAPER TEXT EMPHASIZING FILTER (TEXT EMPHASIZING FILTER 2) |
| NEWSPAPER (OTHER) | | OFF | PHOTOGRAPH COLOR CORRECTION TABLE (PHOTOGRAPH MODE 1) | NO FILTER |
| TEXT | OFF | ON | TEXT COLOR CORRECTION TABLE (TEXT MODE 1) | NON-NEWSPAPER TEXT EMPHASIZING FILTER (TEXT EMPHASIZING FILTER 1) |
| HALFTONE | OFF | OFF | PHOTOGRAPH COLOR CORRECTION TABLE (PHOTOGRAPH MODE 1) | HALFTON-SMOOTHING FILTER (SMOOTHING FILTER 2) |
| PHOTOGRAPH | OFF | OFF | PHOTOGRAPH COLOR CORRECTION TABLE (PHOTOGRAPH MODE 1) | PHOTOGRAPH-SMOOTHING FILTER (SMOOTHING FILTER 1) |

FIG. 9 (a) (HALFTONE-SMOOTHING FILTER)

| 0.028 | 0.035 | 0.043 | 0.035 | 0.028 |
|---|---|---|---|---|
| 0.028 | 0.045 | 0.054 | 0.045 | 0.035 |
| 0.043 | 0.054 | 0.064 | 0.054 | 0.043 |
| 0.028 | 0.045 | 0.054 | 0.045 | 0.035 |
| 0.012 | 0.035 | 0.043 | 0.035 | 0.028 |

FIG. 9 (b) (PHOTOGRAPH-SMOOTHING FILTER)

| 0 | 0.023 | 0.031 | 0.023 | 0 |
|---|---|---|---|---|
| 0.023 | 0.055 | 0.086 | 0.055 | 0.023 |
| 0.031 | 0.086 | 0.128 | 0.086 | 0.031 |
| 0.023 | 0.055 | 0.086 | 0.055 | 0.023 |
| 0 | 0.023 | 0.031 | 0.023 | 0 |

FIG. 9 (c) (NEWSPAPER TEXT EMPHASIZING FILTER)

| −0.007 | −0.028 | −0.043 | −0.028 | −0.007 |
|---|---|---|---|---|
| −0.028 | 0.05 | 0.193 | 0.05 | −0.028 |
| −0.043 | 0.193 | 0.452 | 0.193 | −0.043 |
| −0.028 | 0.05 | 0.193 | 0.05 | −0.028 |
| −0.007 | −0.028 | −0.043 | −0.028 | −0.007 |

FIG. 9 (d) (NON-NEWSPAPER TEXT EMPHASIZING FILTER)

| −0.016 | −0.063 | −0.094 | −0.063 | −0.016 |
|---|---|---|---|---|
| −0.063 | 0.047 | 0.29 | 0.047 | −0.063 |
| −0.094 | 0.29 | 0.596 | 0.29 | −0.094 |
| −0.063 | 0.047 | 0.29 | 0.047 | −0.063 |
| −0.016 | −0.063 | −0.094 | −0.063 | −0.016 |

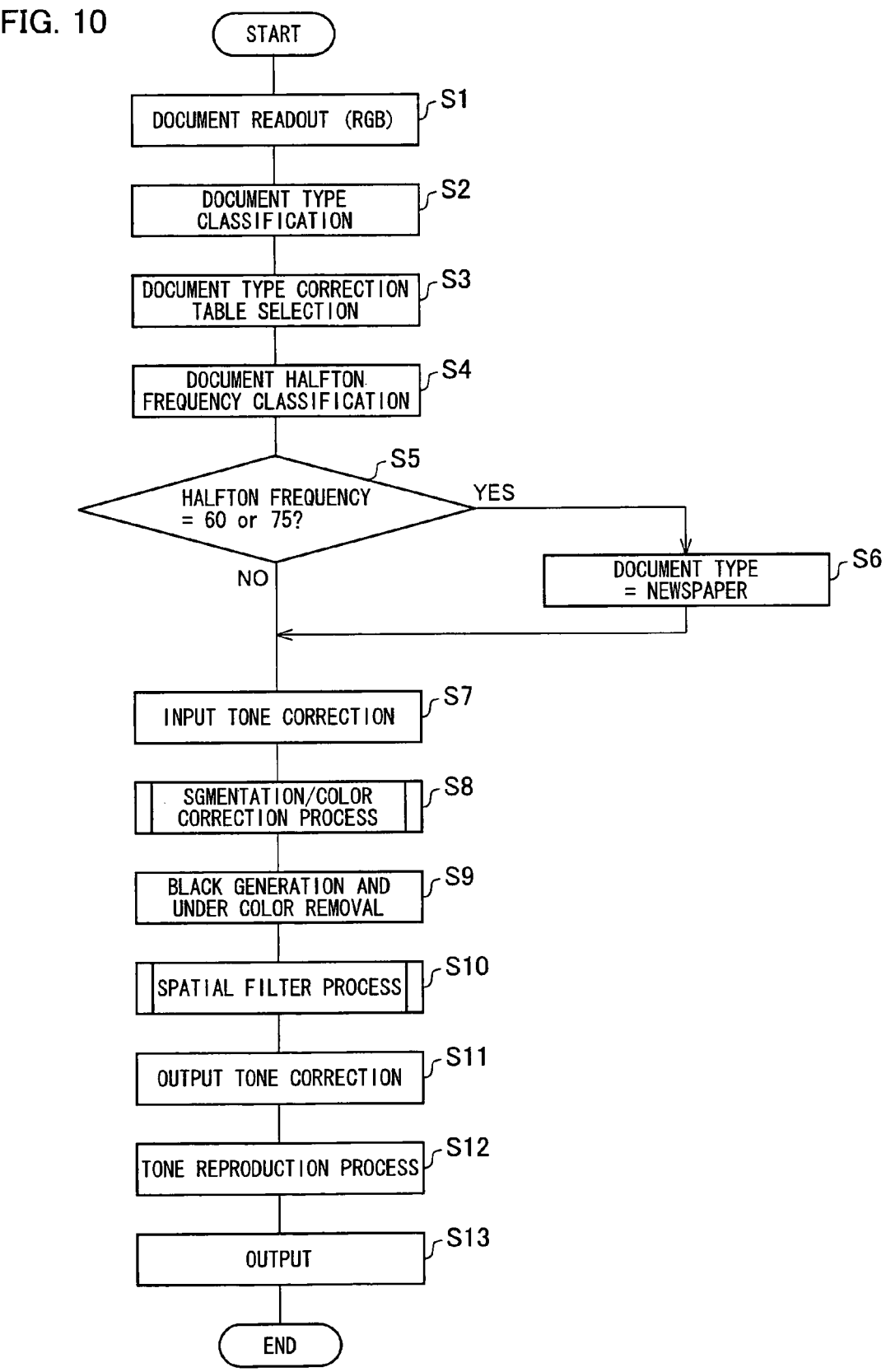

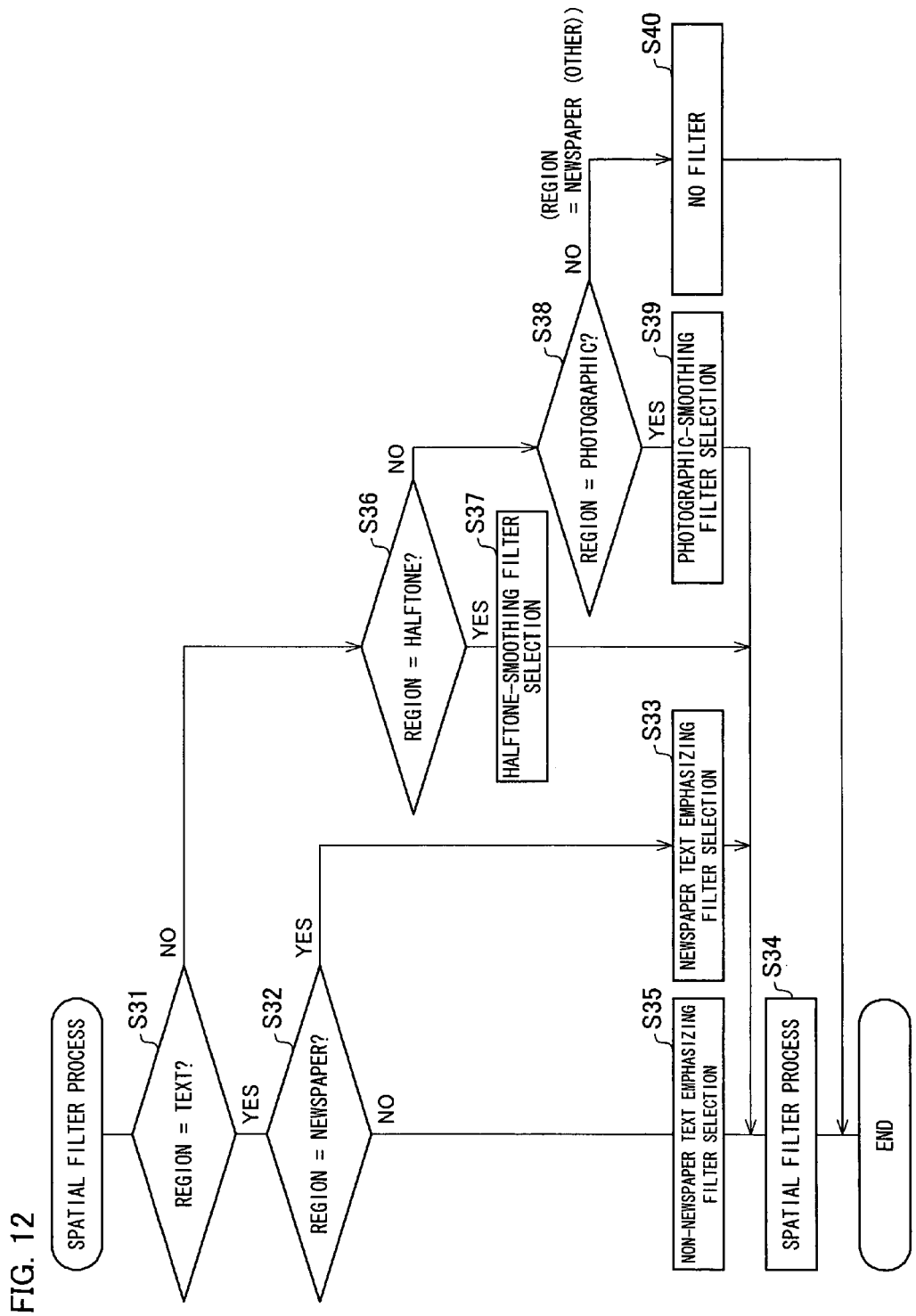

IMAGE PROCESSING APPARATUS AND METHOD INCLUDING PAGE-BACKGROUND PROCESS CAPABILITY, AND NON-TRANSITORY COMPUTER READABLE STORAGE MEDIUM FOR CAUSING COMPUTER TO FUNCTION AS THE SAME

This Nonprovisional application claims priority under 35 U.S.C. §119(a) on Patent Application No. 037170/2007 filed in Japan on Feb. 16, 2007, the entire contents of which are hereby incorporated by reference.

FIELD OF THE INVENTION

The present invention relates to an image processing method, an image processing apparatus, an image forming apparatus, a program, and a storage medium, each for processing an input image data.

BACKGROUND OF THE INVENTION

As an image forming apparatus such as a copying apparatus, a printer and the like using a digital photographic process or an inkjet technique, a full-color copying apparatus, a complex machine and the like which reproduces high quality color images has been manufactured according to development of digital image processing techniques.

In these image forming apparatuses, in order to obtain a successful reproductive image of a document image, it is required to perform an image processing suitable for each type of the document image. For this reason, in the image forming apparatus, a segmentation process is performed to separate an input image data to be processed into multiple regions.

For example, Patent Document 1 discloses that each pixel of an input image data is separated into a halftone region, a text region, a photographic paper region, a page-background region, and an indefinite region to which pixels, which cannot be classified in any regions above, belong. The page-background region is a background section where brightness of the image is more than a certain degree. Therefore, pixels belonging to the page-background region are separated based on the brightness.

Moreover, Patent Document 2 discloses a page-background density is removed by an automatic exposure process with respect to a region separated into the page-background region. The automatic exposure process is a method to obtain a high quality image by determining a document type and selecting a color correction property according to the document type.

With the conventional configurations, the page-background removal process is performed, so that a text can be vividly reproduced in an image having the text. Furthermore, as a series of processes, a black generation process, an under color removal process (UCR), and a filter process (edge emphasizing process) are performed, so that the text on the page-background is reproduced in such a manner that the page-background around the text does not become white.

Patent Document 1: Japanese Unexamined Patent Publication, Tokukai, No. 2004-272557 (published on Sep. 30, 2004)

Patent Document 2: Japanese Unexamined Patent Publication, Tokukai, No. 2001-285635 (published on Oct. 12, 2001)

As described above, in ordinary printings except a newspaper, the page-background removal process is just performed, so that a visual sharpness of the text can be improved in an image printed by the image forming apparatus. This is because in ordinary printings except for a newspaper, a density change of a text edge section is clear.

However, unfortunately, in the case where an image to be processed is printed on a newspaper, when the page-background removal process is performed, a visual sharpness of the text becomes rather lower. This is because a quality of recycled papers used for newspapers and the like is rough. Therefore, the text printed thereon has a wide density change region at the edge section and the edge section is blurred. Accordingly, when a gray page-background is removed, the edge section of the text is rather more blurred.

SUMMARY OF THE INVENTION

An object of the present invention is to provide an image processing method, an image processing apparatus, an image forming apparatus, a program, and a storage medium, each of which can prevent deterioration of a visual sharpness of a text in a document image printed on a newspaper.

In order to achieve the object, an image processing apparatus of the present invention includes: document type classification means for determining whether input image data is image data for a text document or not; newspaper document classification means for determining whether the input image data is image data for a newspaper document or not; page-background region classification means for identifying a page-background region in the input image data; and page-background process means for, if the input image data is classified as the text document and but not the newspaper document and if a page-background removal process is to be performed, performing a first page-background removal process to the input image, but if the input image data is classified as the text document and the newspaper document, not performing the first page-background removal process to the input image data.

Also, an image processing method of the present invention includes the steps of: determining whether input image data is image data for a text document or not; determining whether the input image data is image data for a newspaper document or not; identifying a page-background region in the input image data; and if the input image data is classified as the text document and but not the newspaper document and if a page-background removal process is to be performed to the input image data, performing a first page-background removal process to the input image, but if the input image data is classified as the text document and the newspaper document, not performing the first page-background removal process to the input image data.

With this configuration, if the input image data is classified as the text document and the newspaper document (newspaper (text) document), the page-background removal process (first page-background removal process), which is usually performed to the text document, is not performed. Thereby, a blurred edge section of the text is not emphasized in the newspaper (text) document in which the edge section of the text is blurred since paper quality is rough and gray because of a recycled paper, compared with the conventional process in which the blurred edge section is rather emphasized because the gray page-background is removed. Herewith, it is possible to prevent deterioration of a visual sharpness of the text in the newspaper (text) document.

BRIEF DESCRIPTION OF THE DRAWINGS

FIG. 7 illustrates which type of documents are to be or not to be processed with a page-background removal process by the color correction section illustrated in FIG. 1.

FIG. 8 illustrates which type of documents are to be or not to be performed with an automatic exposure process in the color image processing apparatus illustrated in FIG. 1. FIG. 8 also illustrates color correction process and filter process according to the document types in the color image processing apparatus illustrated in FIG. 1.

FIG. 9(a) is a view illustrating a halftone-smoothing filter included in the spatial filter process section illustrated in FIG. 1. FIG. 9(b) is a view illustrating a photograph-smoothing filter included in the spatial filter process section. FIG. 9(c) is a view illustrating a newspaper text emphasizing filter included in the spatial filter process section. FIG. 9(d) is a view illustrating a non-newspaper text emphasizing filter included in the spatial filter process section.

FIG. 10 is a flowchart illustrating an operation of the digital color copying apparatus illustrated in FIG. 1.

FIG. 12 is a flowchart particularly illustrating the spatial filter process in S10 illustrated in FIG. 10.

DESCRIPTION OF THE EMBODIMENTS

An embodiment of the present invention is described as below. Explained in this embodiment is a case where an image processing apparatus of the present invention is applied to a digital color copying apparatus.

Figure 1:
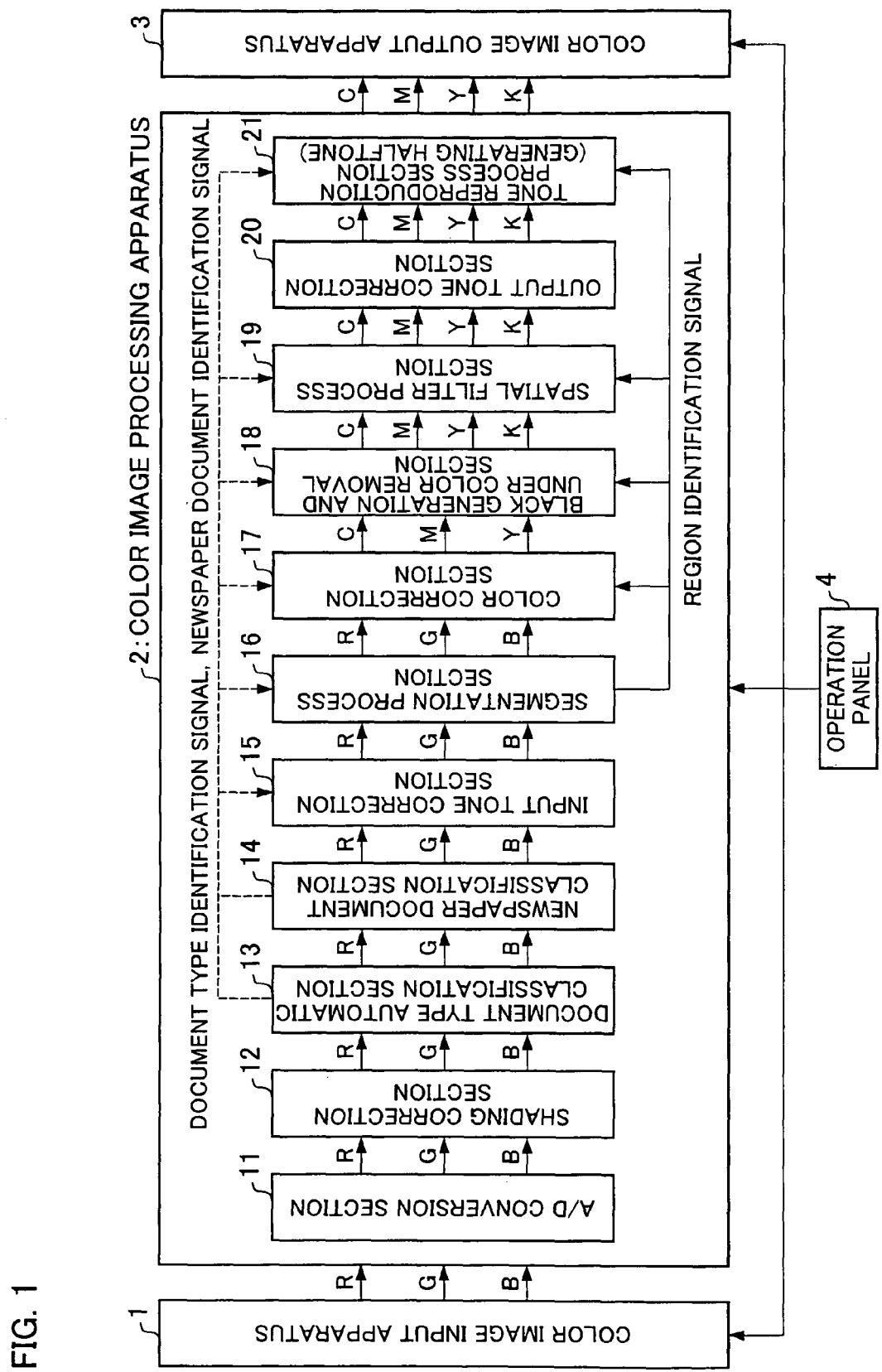
FIG. 1 is a block diagram schematically illustrating a configuration of a digital color copying apparatus including an image processing apparatus in accordance with an embodiment of the present invention.

FIG. 1 is a block diagram schematically illustrating a configuration of a digital color copying apparatus to which a color image processing apparatus of the present invention is applied. As illustrated in FIG. 1, the digital color copying apparatus of this embodiment includes: a color image input apparatus 1; a color image processing apparatus 2; a color image output apparatus 3; and an operation panel 4 (input means). The color image processing apparatus 2 includes: an A/D conversion section 11; a shading correction section 12; a document type automatic classification section (document type classification means) 13; a newspaper document classification section (newspaper document classification means) 14; an input tone correction section 15; a segmentation process section (page-background region classification means) 16; a color correction section 17; a black generation and under color removal section 18; a spatial filter process section (filter processing means) 19; an output tone correction section 20; and a tone reproduction process section 21.

The color image input apparatus 1 has, for example, a scanner section (not illustrated) including CCD (Charge Coupled Device). In the color image input apparatus 1, the CCD reads an optical image reflected from a document as RGB (R: Red, G: Green, B: Blue) analog signals and supplies the RGB analog signals to the color image processing apparatus 2.

The analog signals read by the color image input apparatus 1 are transmitted to the A/D conversion section 11, the shading correction section 12, the document type automatic classification section 13, the newspaper document classification section 14, the input tone correction section 15, the segmentation process section 16, the color correction section 17, the black generation and under color removal section 18, the spatial filter process section 19, the output tone correction section 20, and the tone reproduction process section 21 in this order in the color image processing apparatus 2. Ultimately, the analog signals are supplied to the color image output apparatus 3 as CMYK digital color signals.

The A/D (Analog/Digital) conversion section 11 converts the RGB analog signals to the digital signals.

The shading correction section 12 removes various distortion produced in illumination system, image formation system, and image pickup system of the color image input apparatus 1 from the RGB digital signals transmitted from the A/D conversion section 11. Moreover, the shading correction section 12 adjusts color balance. The shading correction is performed, for example, by reading a white reference plate.

The document type automatic classification section 13 converts the RGB signals (RGB reflectivity signals), which is output from the shading correction section 12, into signals such as a density signal or the like, which can be easily handled by an image processing system used in the color image processing apparatus 2. Also, the document type automatic classification section 13 determines a document type. In determining the document type, a maximum density difference and a total density busyness (sum of absolute values of differences in color density between adjacent pixels within a n×m pixels including a target pixel (where n and m are natural number, such as a block of 15×15 pixels)) of the image signals are calculated. The relationship between the maximum density difference and the total density busyness determines which of these regions each pixel belongs to, a page-background region, a photographic paper region (photographic region), a halftone region, or a text region.

The following describes how the document type automatic classification section 13 determines document types. FIGS. 2(a) through (d) are examples of a pixel density distribution in each of the page-background region, the photographic paper region, the halftone region, and the text region. Also, a distribution in which the maximum density difference and the total density busyness of each region are provided as an index is described with reference to FIG. 3. In the relationship between the total density busyness and the maximum density difference, the total density busyness is always greater than the maximum density difference. Therefore, in FIG. 3, no pixel exists in a region where the total density busyness is equal or less than the maximum density difference.

Figure 2:
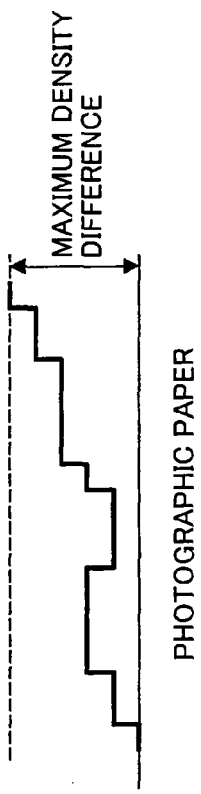
FIG. 2(a) is a view illustrating a maximum density difference and a density distribution in a page-background region.
FIG. 2(b) is a view illustrating a maximum density difference and a density distribution in a photographic paper region.
FIG. 2(c) is a view illustrating a maximum density difference and a density distribution in a halftone region.
FIG. 2(d) is a view illustrating a maximum density difference and a density distribution in a text region.
Figure 2:
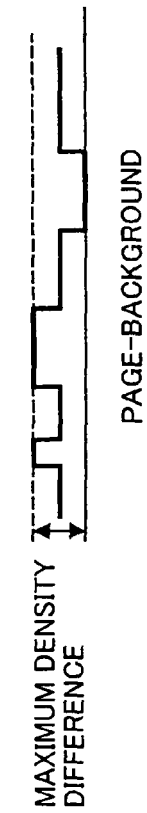
Figure 2:
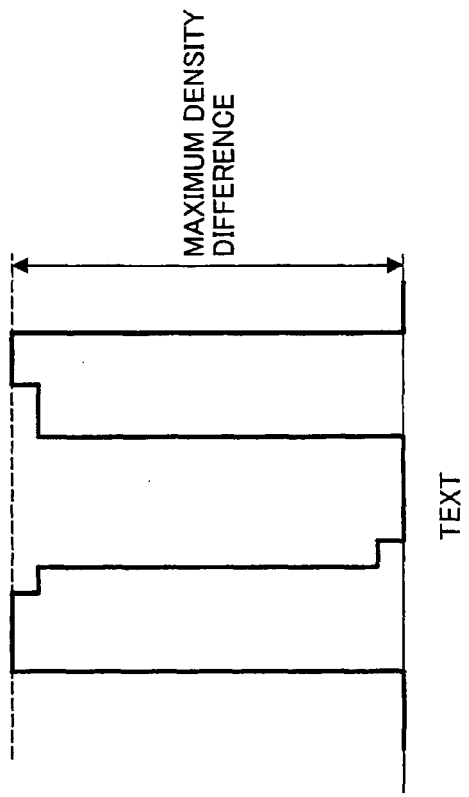
Figure 2:
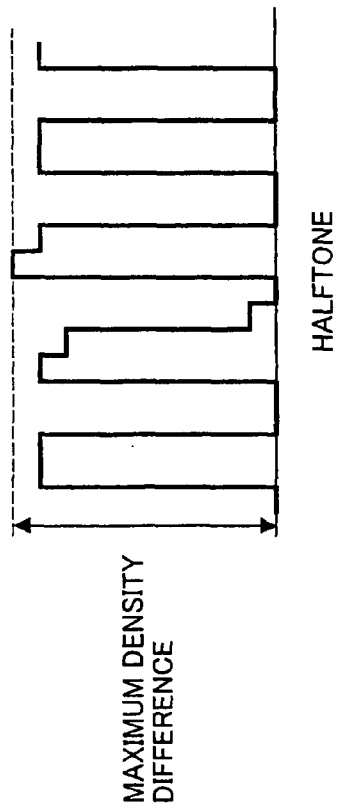
Figure 3:
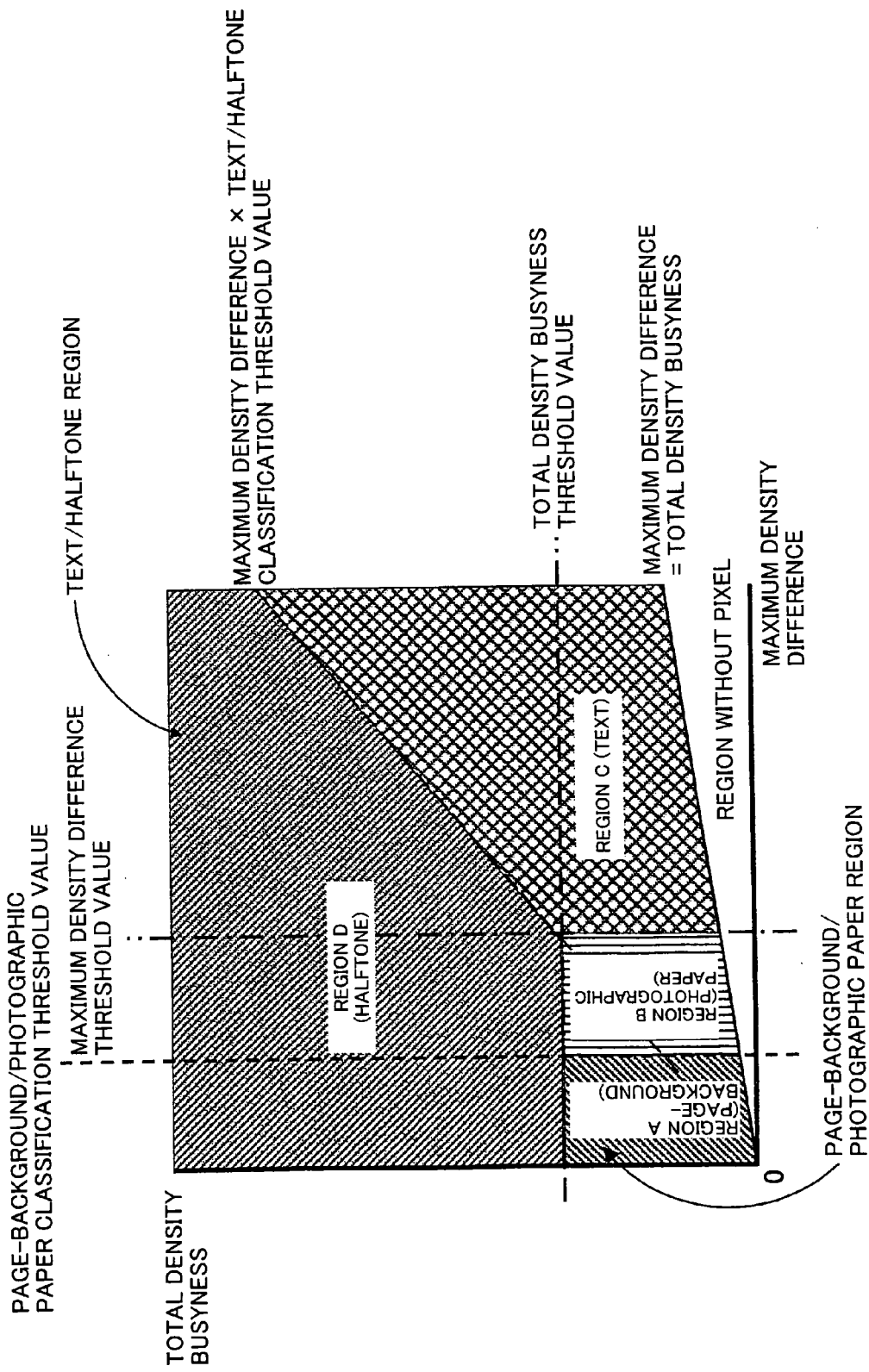
FIG. 3 is a graph illustrating a relationship between the maximum density difference and the total density busyness of each region illustrated in FIG. 2.

As illustrated in FIG. 2(a), in the page-background region, a density change is usually monotonous. Therefore, the maximum density difference and the total density busyness are very small. Pixels belonging to the page-background region are distributed in a region A illustrated in FIG. 3. Accordingly, a pixel that is classified as a pixel belonging to a page-background/photographic paper region, and that has the maximum density difference less than a background/photographic classification threshold value can be classified as a pixel belonging to the page-background region.

As illustrated in FIG. 2(b), in the photographic paper region, a density change is usually smooth. Therefore, the maximum density difference and the total density busyness are small and greater than ones in the page-background region to a certain degree. Pixels belonging to the photographic paper region are distributed in a region B illustrated in FIG. 3. Accordingly, a block pixel (target pixel) that is classified as a pixel belonging to the page-background/photographic paper region, and that has the maximum density difference greater than the page-background/photographic paper classification threshold value can be classified as a pixel belonging to the photographic paper region.

As illustrated in FIG. 2(c), in the halftone region, the maximum density difference varies depending on a halftone, and the number of density changes is as many as the number of the halftones. Therefore, a proportion of the total density busyness to the maximum density difference becomes high. Thus, pixels belonging to the halftone region are distributed in a region D illustrated in FIG. 3. Accordingly, a block pixel (target pixel) that is classified as a pixel belonging to a text/halftone region, and that has the total density busyness greater than a product of the maximum density difference and a text/halftone classification threshold value can be classifies as a pixel belonging to the halftone region.

As illustrated in FIG. 2(d), in the text region, the maximum density difference is great, and accordingly, the total density busyness is also great. However, a density change in the text region is less than in the halftone region. Therefore, the total density busyness in the text region is less than one in the halftone region. Especially, a proportion of the total density busyness to the maximum density difference is low. Accordingly, pixels of the text region are distributed in a region C illustrated in FIG. 3. Therefore, a block pixel (target pixel) that is classified as a pixel belonging to the text/halftone region, and that has the total density busyness less than the product of the maximum density difference and the text/halftone classification threshold value can be classified as a pixel belonging to the text region.

As described above, the maximum density difference and the total density busyness are less in the page-background and photographic paper regions than in the text and halftone regions. Accordingly, by comparing the maximum density difference with a maximum density difference threshold value (a first maximum density difference threshold value THd1), and also comparing the total density busyness with the total density busyness threshold value (a first total density busyness threshold value THb1), the document type automatic classification section 13 can determine which region of the page-background/photographic paper region or the text/halftone region the target pixel belongs to.

The newspaper document classification section 14 determines whether a document image is classified as a newspaper document or not, and outputs newspaper document identification signal which indicates the determination result. This determination is carried out by calculating a halftone frequency in the halftone region of the document image. If the halftone frequency in the halftone region is 60 lines or 75 lines, which is a typical halftone frequency, the document (document image) is classified as a newspaper document.

These document type identification signal and newspaper document identification signal respectively produced in the document type automatic classification section 13 and the newspaper document classification section 14 are output to the input tone correction section 15, the color correction section 17, the black generation and under color removal section 18, the spatial filter process section 19, and the tone reproduction process section 21.

The input tone correction section 15 adjusts image quality by removing page-background density, adjusting contrast or the like according to the document type indicated by the document type identification signal.

The segmentation process section 16 classifies each pixel of the input image as a pixel belonging to any one of the text region, the halftone region, or the photographic (photographic paper) region based on the RGB signal. The segmentation process section 16 outputs a region identification signal indicating to which region the pixel belongs to the color correction section 17, the black generation and under color removal section 18, the spatial filter process section 19, and the tone reproduction process section 21 based on the determination result. Moreover, the segmentation process section 16 outputs the input signals from the input tone correction section 15, without any modification, to the color correction section 17, which is a subsequent section of the segmentation process section 16.

The color correction 17 converts the RGB signals output from the segmentation process section 16 into CMY (C: Cyan, M: Magenta, Y: Yellow) signals. For faithful color reproduction, the color correction section 17 removes turbidenss in colors, based on spectral characteristics of CMY color materials containing unnecessary absorption elements. In addition, the color correction section 17 corrects colors using color correction tables depending on which document type is indicated by the document type identification signal, whether the document is classified as the newspaper document by the newspaper document identification signal, and which region is indicated by the region identification signal.

Figure 4:
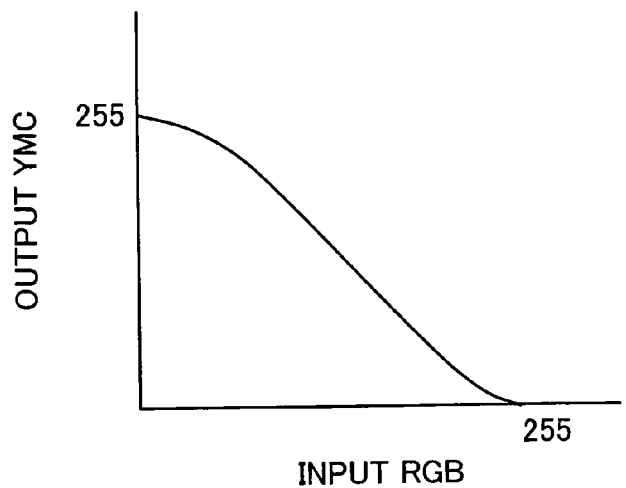
FIG. 4(a) is a graph illustrating a relationship between an input (RGB) and an output (CMY) in a photograph color correction table.
FIG. 4(b) is a graph illustrating a relationship between an input (RGB) and an output (CMY) in a text (with page-background removal) color correction table.
FIG. 4(c) is a graph illustrating an input (RGB) and an output (CMY) in a text (without page-background removal) color correction table.
Figure 4:
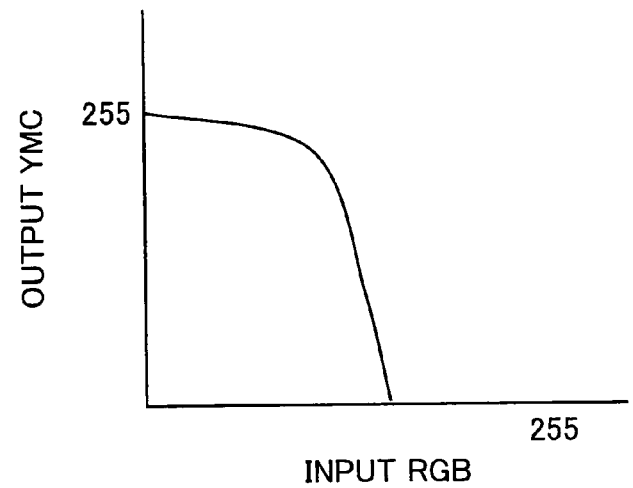
Figure 4:
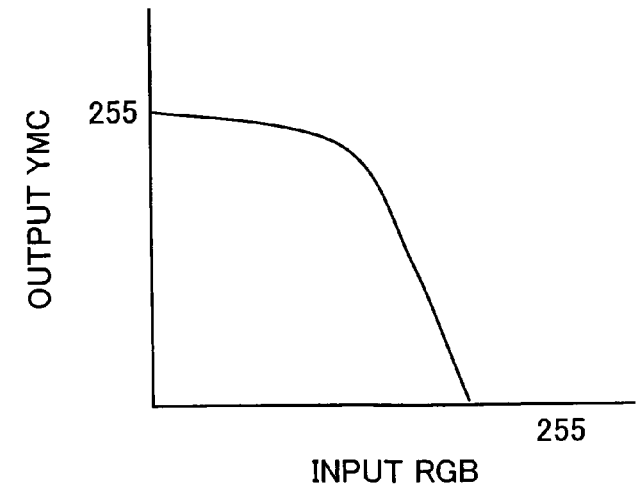
Figure 5:
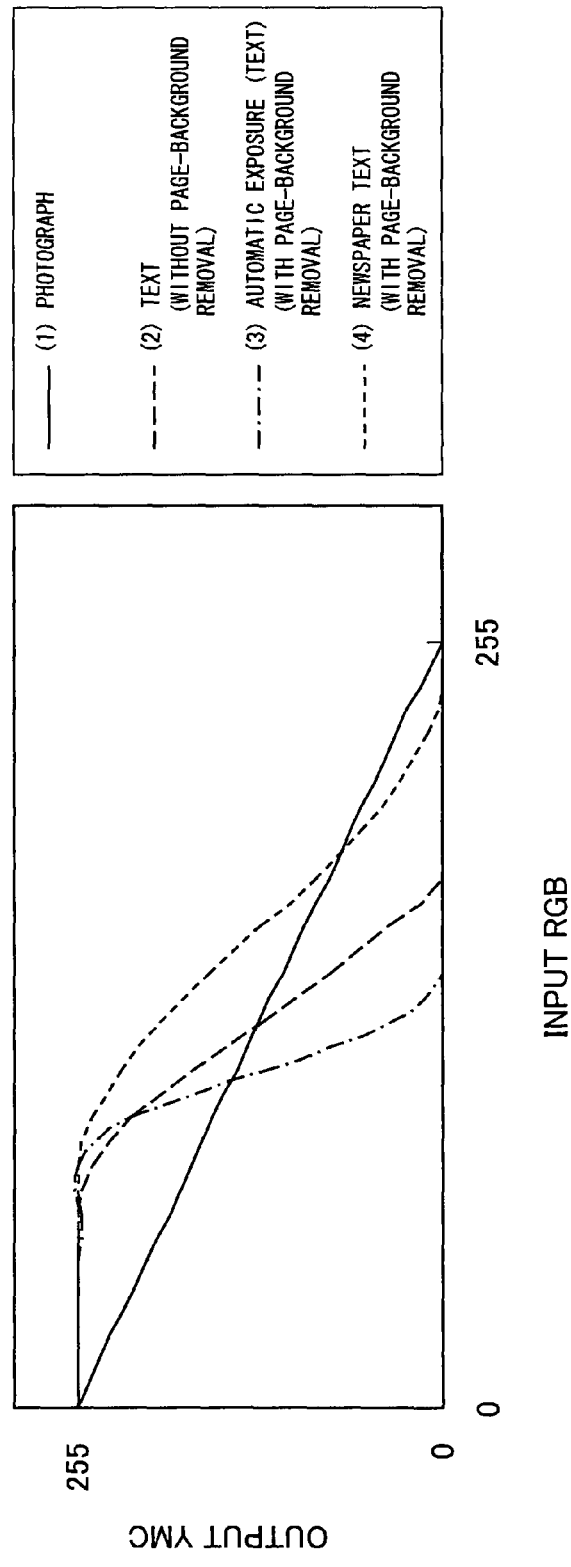
FIG. 5 is a view illustrating each relationship between an input (RGB) and an output (CMY) in a photograph color correction table, a text (without page-background removal) color correction table, an automatic exposure (with page-background removal) color correction table and a newspaper text (with page-background removal) color correction table.

Therefore, the color correction section 17 includes a photograph color correction table, a text (without page-background removal) color correction table, an automatic exposure (with page-background removal) color correction table, and a newspaper text color correction table. The automatic exposure (with page-background removal) color correction table is corresponding to a text (with page-background removal) color correction table. FIG. 4 illustrates a conventional color correction TBL. FIG. 4(a) illustrates a relationship between an input (RGB) and an output (CMY) in the photograph color correction table, FIG. 4(b) illustrates a relationship between an input (RGB) and an output (CMY) in the text (with page-background removal) color correction table, and FIG. 4(c) illustrates a relationship between an input (RGB) and an output (CMY) in the text (without page-background removal) color correction table. FIG. 5 illustrates a color correction TBL used in this embodiment of the present invention, illustrating each relationship between an input (RGB) and an output (CMY) in (1) a photograph color correction table, (2) a text (without page-background removal) color correction table, (3) an automatic exposure (with page-background removal) color correction table and (4) a newspaper text (with page-background removal) color correction table.

Figure 6:
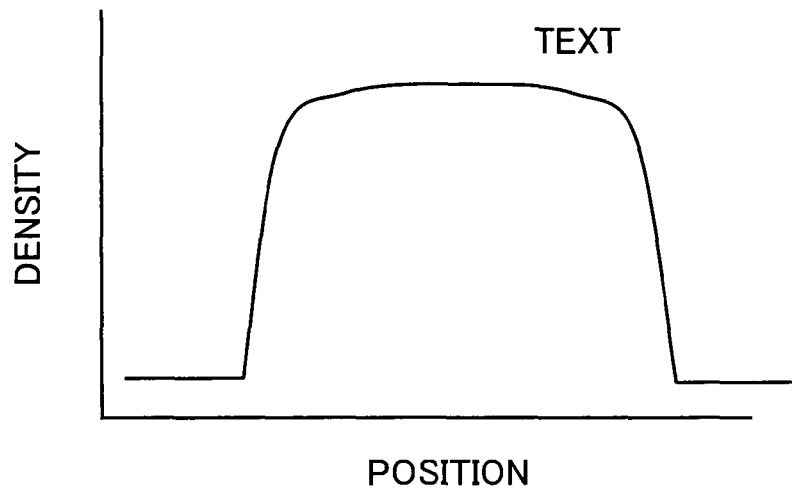
FIG. 6(a) is a graph illustrating a density change of a text in an ordinary text document except for a newspaper.
FIG. 6(b) is a graph illustrating a density change of a text in a newspaper (text) document.
Figure 6:
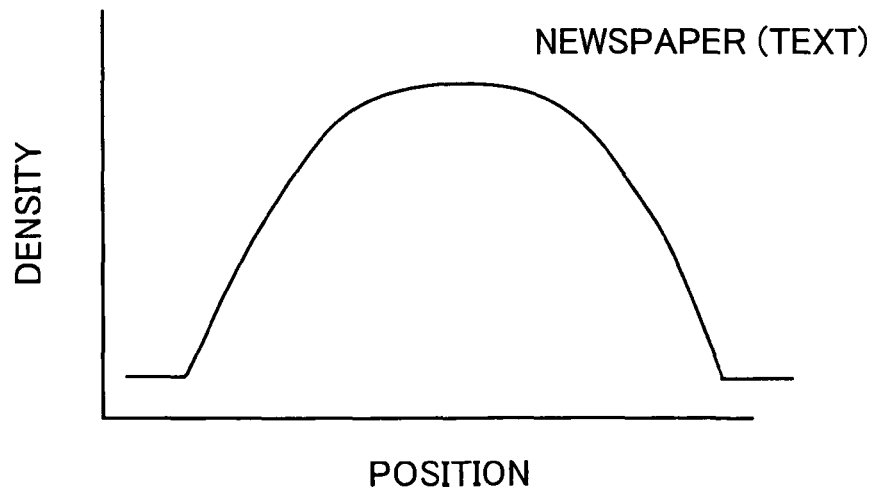

Here, FIG. 6(a) illustrates a density change of a text in an ordinary text document except a newspaper, and FIG. 6(b) illustrates a density change of a text of a newspaper (text) document, that is, a newspaper document composed of only texts. As described in these figures, while the density change of the text edge becomes steep in the text document (FIG. 6(a)), the density change in the newspaper (text) document becomes smooth. Therefore, it is not preferable to perform the page-background removal process to the newspaper (text) document in a similar way of the text document. This is because when such a process is performed, the blurred text edge in the newspaper (text) document is emphasized, and a visual sharpness of the text is rather lowered. Therefore, when the document has the page-background and the page-background is to be removed, the page-background removal process is to be performed to the newspaper (text) document in a different way from the text document.

FIG. 7 illustrates which type of documents are to be or not to be performed with the page-background removal process by the color correction section 17, in the case where a document has a page-background. As illustrated in FIG. 7, if a document is classified as the text document or the newspaper (text) document, the page-background removal process is performed. If a document is classified as other document types, the page-background removal process is not performed. However, as mentioned above, the page-background removal process is performed to the text document in a different way from the newspaper (text) document.

FIG. 8 illustrates which type of documents are to be or not to be performed with an automatic exposure process, which color correction process is performed in the color correction section 17 according to the document types, and which filter process is performed in the spatial filter process section 19 according to the document types. As illustrated in FIG. 8, in this embodiment, a conventional automatic exposure process is performed to a document image (document image data) classified as the text document with the page-background, and not performed to the newspaper (text) document. In the color correction section 17, the newspaper color correction table is used for the newspaper (text) document having the page-background. When a document is a newspaper (other) document, a text document without the page-background, a halftone document, or a photographic document, each process is performed as illustrated in FIG. 8. The newspaper (other) document includes a newspaper (text and halftone, photograph or the like) document and a newspaper (photograph) document.

When a document is classified as the newspaper (text) or the newspaper (other), a gray page-background of the newspaper is always included. Accordingly, in FIG. 8, the automatic exposure process, which is performed to a document without a page-background, is never performed to the newspaper document, and diagonal lines are drawn in the corresponding sections.

The newspaper color correction table, which is used for color correction in the case where a document type is classified as the newspaper (text), is always used for a document with page-background removal, and for a document without page-background, the text (without page-background removal) color correction table is used. In the case where a document type is classified as the text, the text (without page-background removal) color correction table is used for a document without the page-background removal, and the automatic exposure (with page-background removal) color correction table is used for a document with the page-background removal.

The black generation and under color removal section 18 performs black generation process for generating a black (K) signal from three color (CMY) signals after the color correction process, and generation process for generating new CMY signals by deducting the K signal obtained by the black generation process from the original CMY signals. Consequently, the three CMY color signals are converted into four CMYK color signals.

One example of the black generation process is a method (general method) in which the black generation process is performed by skeleton black. In this method, when an input/output characteristic of a skeleton curve is expressed by y=f(x), C, M, and Y indicate a data to be input, C', M', Y', and K' indicate a date to be output, and a UCR (Under Color Removal) rate is α (0≦α≦1), the black generation and under color removal process is expressed by the following equation (1).

$$K'=f\{\min(C,M,Y)\}$$

$$C'=C-\alpha K'$$

$$M'=M-\alpha K'$$

$$Y'=Y-\alpha K' \quad (1)$$

In the spatial filter process section 19, a spatial filter process with a digital filter such as emphasizing and smoothing a text or the like is performed to an image data of the CMYK signals output by the black generation and under color removal section 18, according to the region indicated by the region identification signal and the determination result indicated by the document type identification signal and the newspaper document identification signal. In the spatial filter process, a spatial frequency characteristic is corrected so as to prevent a blur or granularity deterioration in an output image.

More specifically, as illustrated in FIG. 8, when a document type is the newspaper (text), a newspaper text emphasizing filter is used, and when a document type is the newspaper (other), any filter is not used. When a document type is the text, a non-newspaper text emphasizing filter is used. When a document type is the halftone, a halftone-smoothing filter is used. When a document type is the photograph, a photograph-smoothing filter is used.

One example of each filter is illustrated in FIG. 9. FIG. 9(a) is a view illustrating a halftone-smoothing filter, FIG. 9(b) is a view illustrating a photograph-smoothing filter, FIG. 9(c) is a view illustrating a newspaper text emphasizing filter, and FIG. 9(d) is a view illustrating a non-newspaper text emphasizing filter.

In each filter, a center of 5×5 (pixels) is a target pixel. Each filter refers to the target pixel and pixels surrounding the target pixel and distanced from the target pixel by two pixels. To be referred to by the filters, the surrounding pixels are weighted with a numerical value. A process in each filter is expressed by the following equation (2).

$$\text{Data}(3, 3) = \sum_{X=1}^{5} \sum_{Y=1}^{5} \{\text{Filter}(X, Y) \cdot \text{Data}(X, Y)\} \quad (2)$$

The output tone correction section 20 performs a halftone correction (Y correction) to the image date composed of the CMYK signals output from the spatial filter process section 19. For example, an output tone correction process is performed to convert a signal such as a density signal and the like to a halftone area ratio which is a characteristic value of the color image output apparatus 3.

The tone reproduction process section 21 generates a halftone data such as a dither matrix data, an error diffusion data or the like on the basis of the image data composed of the CMYK signals output from the output tone correction section 20. In this process, the image is ultimately separated into pixels, so as to reproduce each tone.

The operation panel 4, for example, includes a display section (not illustrated) such as a crystal liquid display or the like and a setup key or the like. Based on input information of the operation panel 4, operations of the color image input apparatus 1, the color image processing apparatus 2, and the color image output apparatus 3 are controlled.

The image data for which each process is performed at the color image processing apparatus 2 is once stored in memory means, and at a given timing, the image data is read out to be input in the color image output apparatus 3. This color image output apparatus 3 is for outputting the image data on a recording medium (such as a paper or the like). For example, the color image output apparatus 3 may be, but not limited to, a color image output apparatus or the like using an electrophotographic system or an inkjet system. The above processes are controlled by a CPU (Central Processing Unit), which is not illustrated here.

Figure 11:
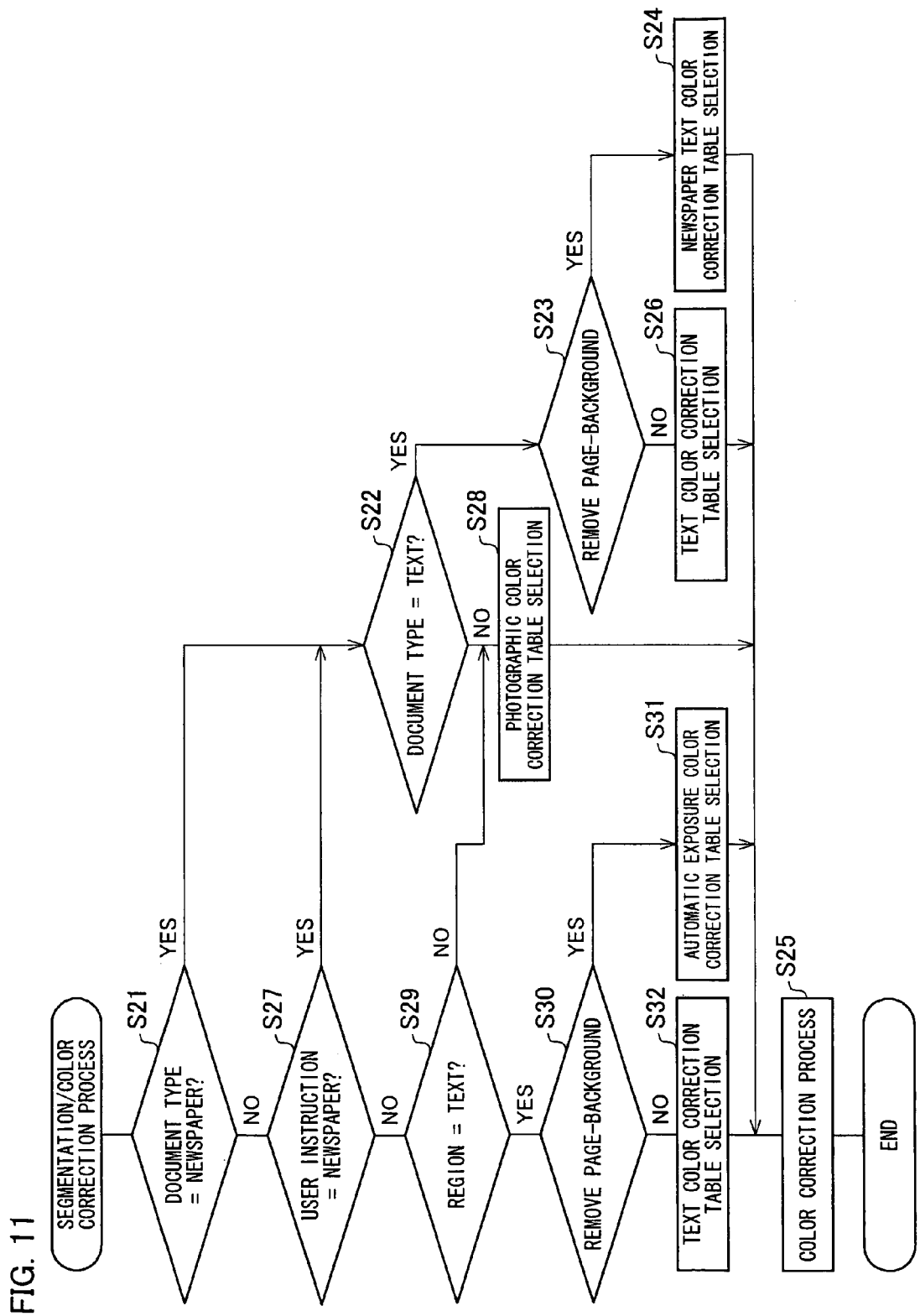
FIG. 11 is a flowchart particularly illustrating the segmentation/color correction process in S8 illustrated in FIG. 10.

In the above configuration, an operation of the digital color copying apparatus of the present embodiment is described with reference to flowcharts of FIG. 10 through FIG. 12. FIG. 10 is a flowchart illustrating an operation of the digital color copying apparatus. FIG. 11 is a flowchart particularly illustrating a segmentation/color correction process in S8 illustrated in FIG. 10. FIG. 12 is a flowchart particularly illustrating a spatial filter process in S10 illustrated in FIG. 10.

In the digital color copying apparatus, the color image input device 1 reads out a document image (SI), and the image data in the form of the RGB signals is input in the color image processing apparatus 2.

The above image data is converted to a digital signal in the A/D conversion section 11. After the image data is processed in the shading correction section 12, the document type is determined by the document type automatic classification section 13 (S2). The document type automatic classification section 13 selects a color correction table according to the document type determination result, and then selects a spatial filter according to the region determination result. In addition, the document type automatic classification section 13 outputs the document type identification signal, which indicates the document type classification result, to each consecutive section after the input tone correction section 15 except for the output tone correction section 20.

Then, the newspaper document classification section 14 determines whether the document is a newspaper document or not based on the image data output from the document type automatic classification section 13. Therefore, the newspaper document classification section 14 calculates the halftone frequency of the document image. If the halftone frequency is 60 lines or 75 lines, the document is classified as the newspaper (S6). If the halftone frequency is not 60 lines or 75 lines, the document is classified as the document other than the newspaper. Thus, because the newspaper document has a prescribed halftone frequency, when the halftone frequency of the document is calculated, it is possible to determine whether the document is classified as the newspaper document or not. The newspaper document identification signal indicating the determination result is output to each consecutive section after the input tone correction section 15 except for the output tone correction section 20 in a similar way of the document type identification signal.

After that, the image data output by the newspaper document classification section 14 is processed in the input tone correction section 15 (S7), and input in the segmentation process section 16 and consecutively in the color correction section 17. The segmentation process 16 and the color correction section 17 perform the segmentation/color correction process (S8).

The image data processed in the segmentation process section 16 and the color correction section 17 is processed in the black generation and under color removal section 18 (S9), and then processed by using the spatial filter in the spatial filter process section 19 (S10).

Furthermore, the output tone correction in the output tone correction section 20 (S11) and the tone reproduction process in the tone reproduction process section (S12) are performed to the image data processed in the spatial filter process section 19. The image data is then transmitted to the color image output apparatus 3. Herewith, this color image output apparatus 3 outputs the image data as a visible image (S13).

The following describes the segmentation/color correction process in S8 with reference to the flowchart of FIG. 11. This process determines whether a document type of the image data is the newspaper or not based on the newspaper document identification signal (S21). If the document type is the newspaper, this process further determines whether the image data is classified as the text or not based on the document type identification signal (S22).

When the image data is classified as the text in S22, it is determined whether the page-background is to be removed or not (S23). When the page-background is to be removed according to the determination in S23, the color correction section 17 selects the newspaper text color correction table (S24), and performs the color correction process (S25). On the other hand, when the page-background is not to be removed according to the determination in S23, the color correction section 17 selects the text color correction table (S26), and performs the color correction process (S25).

The determination in S23 is performed, for example, based on a user's setting from the operation panel 4. If any user's setting is not arranged, the page-background removal is performed using the newspaper text color correction table according to the setting in FIG. 7 since the document classified as the newspaper (text) has the page-background in the newspaper texture.

Even if the document is not classified as the newspaper in S21, for example, when the user selects the newspaper on the operation panel 4, the document is classified as the newspaper, and the process is proceed to S22.

When the document is not classified as the newspaper (text) in S22, that is, the document is classified as the newspaper (other), the color correction section 17 selects the photograph color correction table (S28), and the color correction process is performed (S25).

When the document is not classified as the newspaper (S21, S27), and the region indicated by the region identification signal is not the text (S29), the color correction section 17 selects the photograph color correction table (S28), and the color correction process is performed (S25).

When the region indicated by the region identification signal is the text in S29 and the page-background is to be removed (S30), the color correction section 17 selects the automatic exposure color correction table (S31), and the color correction process is performed (S25).

When the page-background is not to be removed in S30, the color correction section 17 selects the text color correction table (S32), and the color correction process is performed (S25).

A user can select whether the page-background removal process is to be performed or not in S30, for example, by using the operation panel 4 in a similar manner of S23.

The following describes the spatial filter process in S10 with reference to the flowchart of FIG. 12. When a region is the text (S31) and also the newspaper (S32), the spatial filter process section 19 selects the newspaper text emphasizing filter and performs the spatial filter process (S34).

If the region is the text (S31), but not the newspaper (S32), the non-newspaper text emphasizing filter is selected (S33) and the spatial filter process is performed (S34).

If the region is not the text (S31), but the halftone (S36), the halftone smoothing filter is selected (S37), and the spatial filter process is performed (S34).

If the region is not the text (S31) and the halftone (S36), but the photograph (S38), the photograph smoothing filter is selected (S39), and the spatial filter process is performed (S34).

If the region is not the text (S31), the halftone (S36) and the photograph (S38), any filter is not used (S40). Therefore, in this case, the spatial filter process is not performed.

As described above, in the image processing device of the embodiment, when the page-background process is performed to the document classified as the newspaper and the text, the newspaper text color correction table is used. The newspaper text color correction table is different from the text color correction table used for the page-background process for the text document other than the newspaper. The text color correction table is used for the conventional automatic exposure process. On the other hand, compared with the text color correction table, the newspaper text color correction table processes a density change of a text edge to be smoother. In other words, the newspaper text color correction table processes a region where the density of the text edge changes to become wider. Herewith, the image processing apparatus of the embodiment can prevent deterioration of visual sharpness of the text in the output image when the newspaper (text) document is processed.

In the present invention, the above image processing method can be stored in a storage medium, which stores a program executed by a computer and is readable by the computer. This makes it possible to provide the portable storage medium storing the program to perform the image processing method for determining document types.

In the present embodiment, as the storage medium, in order to perform the processes by a microcomputer, a program medium may be, for example, a memory, which is not illustrated here, such as a ROM, a program medium itself. Alternatively, though it is not illustrated here, the program medium may be the one which is readable by inserting the storage medium in a program-reading device provided as an external storage device.

In either case, the stored program may be executed when a microprocessor accesses. Alternatively, in either case, after the program is read, the read program may be executed when downloaded in a program-stored area of the microcomputer, which is not illustrated here. The program for download is stored in the main body apparatus in advance.

The program medium is a storage medium which is separable from the main body, and may be a tape such as a magnetic tape, cassette and the like, a magnetic disk such as a flexible disk, hard disk and the like, an optical disk such as a CD-ROM, MO, MD, DVD and the like, a card such as an IC card (including a memory card), optical card and the like, or a medium to fixedly keeping the program including a semiconductor memory such as a mask ROM, ERPOM (Erasable Programmable Read Only Memory), EEPROM (Electrically Erasable Programmable Read Only Memory), flash ROM and the like.

This embodiment includes a system configuration in which communication network including internet can be connected. Accordingly, the medium may flexibly keep the program like downloading the program from the communication network. In case the program is downloaded from the communication network, a program for download the program may be stored in the main apparatus in advance, or may be installed from another storage medium.

The storage medium is read by the program-reading device provided at a digital color image forming apparatus or a computer system, so that the image processing method is carried out.

The computer system includes: an image input apparatus such as a flat head scanner, film scanner, digital camera and the like; a computer in which various processes such as the above image processing method and the like are carried out by loading prescribed programs; an image display device such as a CRT display, liquid crystal display and the like to display a process result of the computer; and a printer to print out the process result of the computer on a paper or the like. Moreover, the computer system includes a network card or a modem as communication means to be connected with a server through a network.

The present invention is applicable to an apparatus including an image processing capability with respect to an input image, such as a color copying apparatus, a flat head scanner, film scanner, digital camera and the like.

In the above image processing apparatus, if input image data is classified as a text document and a newspaper document and if a page-background of the input image data is to be removed, the page-background process means may perform a second page-background removal process in which a density change of a text edge is processed to become smoother than in the first page-background removal process.

With this configuration, if the input image data is classified as the text document and the newspaper document (newspaper (text) document) and if the page background of the input image data is to be removed, the second page-background removal process is performed. In the second page-background removal process, the density change of the text edge is processed to be smoother than in the first page-background removal process which is generally performed to a text document. Herewith, a gray page-background color in the newspaper (text) document can be removed. In addition, a blur of the text edge is not emphasized. This makes it possible to improve visual sharpness of the text in the newspaper (text) document.

In the above image processing apparatus, the first page-background removal process may be an automatic exposure process which removes a page-background by a color correction characteristic, which is selected according to document types.

With this configuration, a conventional automatic exposure process is applicable as the first page-background removal process.

In the above image processing apparatus, the newspaper document classification means may classify the input image data as a newspaper document when a halftone frequency of a halftone region is a prescribed value which indicates the newspaper document.

With this configuration, when the halftone frequency of the halftone region is calculated, it is easily determined whether the document is classified as the newspaper document or not.

The above image processing apparatus may include input means which a user can operate, the newspaper document classification means classifying the input image data as an image data of the newspaper document according to a use input from the input means.

It is difficult to determine whether a document with only the text region is classified as the newspaper document or not by calculating the halftone frequency. Even in such a case, this configuration makes it possible to identify the newspaper document based on the user input.

The above image processing apparatus may include filtering means to perform a filter process to the image data of the document after the page-background removal process of the page-background process means, if the image data of the document is classified as the newspaper document, the filtering means performing a filter process to the image data in such a manner that the filter process is performed to a text region but not to regions other than the text region.

With this configuration, if the image data of the document is classified as the newspaper document, the filter process is performed to the image data in such a manner that the filter process is performed to the text region but not to the regions other than the text region. Thus, the filter process is not performed to the regions other than the text region in the newspaper document, so that deterioration of the image quality can be prevented.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus comprising:
    document type classification means for determining whether input image data is image data for a text document or not;
    newspaper document classification means for determining whether the input image data is image data for a newspaper document or not;
    page-background region classification means for identifying a page-background region in the input image data; and
    page-background process means for performing a first page-background removal process to the image data if the following three conditions are met: (1) the input image data is the text document, (2) the input image data is not the newspaper document, and (3) a page-background removal process is to be performed to the input image data, and performing a second page-background removal process if the following three conditions are met: (1) the input image data is the text document, (2) the image input data is the newspaper document, and (3) the page-background removal process is to be performed to the input image data, the second page-background removal process being a process in which a density change of a text edge section is processed to become smoother than that in the first page-background removal process.

2. The image processing apparatus as set forth in claim 1, wherein the first page-background removal process is an automatic exposure process in which a page-background is removed by a color correction characteristic, which is selected according to document types.

3. The image processing apparatus as set forth in claim 1, wherein the newspaper document classification means classifies the input image data as the newspaper document when a halftone frequency of a halftone region is a prescribed value which indicates the newspaper document.

4. The image processing apparatus as set forth in claim 1, comprising:
    input means which a user can operate,
    the newspaper document classification means classifying the input image data as the newspaper document according to a user input from the input means.

5. The image processing apparatus as set forth in claim 1, comprising:
    filtering means for performing a filter process to the image data of the document after the page-background removal process of the page-background process means,
    if the image data of the document is classified as the newspaper document, the filtering means performing the filter process to the image data in such a manner that the filter process is performed to a text region but not to regions other than the text region.

6. The image processing apparatus as set forth in claim 1, wherein the first page-background removal process is performed by use of a text color correction table for performing the page-background removal process to image data of a text document, to remove page-background color from the image data, and
    a second page-background removal process is performed by the use of a newspaper text color correction table to remove a page-background color from the image data in such a manner that the density change of the text edge section is processed to become smoother than in the first page-background removal process, the newspaper text color correction table being used for performing the page-background removal process to image data of a newspaper document, an being set in such a manner that (i) a relationship of a density change of output image data to a density change of input image data in the newspaper text color correction table becomes smoother than that in the text color correction table, and (ii) an output is possible to a lower density area of the input image data in the newspaper text color correction table than in the text color correction table.

7. An image forming apparatus comprising an image processing apparatus and performing printing based on image data supplied from the image processing apparatus,
    the image processing apparatus including:
    document type classification means for determining whether input image data is image data for a text document or not;
    newspaper document classification means for determining whether the input image data is image data for a newspaper document or not;
    page-background region classification means for identifying a page-background region in the input image data; and
    page-background process means for performing a first page-background removal process to the image data if the following three conditions are met: (1) the input image data is the text document, (2) the input image data is not the newspaper document, and (3) a page-background removal process is to be performed to the input image data, and performing a second page-background removal process if the following three conditions are met: (1) the input image data is the text document, (2) the image input data is the newspaper document, and (3) the page-background removal process is to be performed to the input image data, the second page-background removal process being a process in which a density change of a text edge section is processed to become smoother than that in the first page-background removal process.

8. A non-transitory computer readable medium having stored thereon a program for causing a computer to work as each means of an image processing apparatus, the image processing apparatus including:
   document type classification means for determining whether input image data is image data for a text document or not;
   newspaper document classification means for determining whether the input image data is image data for a newspaper document or not;
   page-background region classification means for identifying a page-background region in the input image data; and
   page-background process means for performing a first page-background removal process to the image data if the following three conditions are met: (1) the input image data is the text document, (2) the input image data is not the newspaper document, and (3) a page-background removal process is to be performed to the input image data, and performing a second page-background removal process if the following three conditions are met: (1) the input image data is the text document, (2) the image input data is the newspaper document, and (3) the page-background removal process is to be performed to the input image data, the second page-background removal process being a process in which a density change of a text edge section is processed to become smoother than that in the first page-background removal process.

9. An image processing method comprising:
   determining whether input image data is image data for a text document or not;
   determining whether the input image data is image data for a newspaper document or not;
   identifying a page-background region in the input image data; and
   performing a first page-background removal process to the image data if the following three conditions are met: (1) the input image data is the text document, (2) the input image data is not the newspaper document, and (3) a page-background removal process is to be performed to the input image data, and performing a second page-background removal process if the following three conditions are met: (1) the input image data is the text document, (2) the image input data is the newspaper document, and (3) the page-background removal process is to be performed to the input image data, the second page-background removal process being a process in which a density change of a text edge section is processed to become smoother than that in the first page-background removal process.

\* \* \* \* \*